United States Patent
McVay et al.

(10) Patent No.: US 9,399,183 B2
(45) Date of Patent: Jul. 26, 2016

(54) VENT FILTER

(71) Applicant: DOMETIC CORPORATION, Louisville, KY (US)

(72) Inventors: Jeffry McVay, Mount Vernon, OH (US); Benjamin Stork, Columbus, OH (US)

(73) Assignee: DOMETIC CORPORATION, Louisville, KY (US)

( * ) Notice: Subject to any disclaimer, the term of this patent is extended or adjusted under 35 U.S.C. 154(b) by 164 days.

(21) Appl. No.: 14/242,234

(22) Filed: Apr. 1, 2014

(65) Prior Publication Data

US 2015/0273379 A1 Oct. 1, 2015

(51) Int. Cl.
  *B01D 53/02* (2006.01)
  *B01D 46/00* (2006.01)
  *B01D 46/30* (2006.01)
  *B01D 53/04* (2006.01)

(52) U.S. Cl.
  CPC ............ *B01D 46/0038* (2013.01); *B01D 46/30* (2013.01); *B01D 53/0415* (2013.01); *B01D 53/0446* (2013.01); *B01D 2253/102* (2013.01); *B01D 2257/90* (2013.01); *B01D 2259/4566* (2013.01); *B01D 2279/35* (2013.01)

(58) Field of Classification Search
  CPC . B01D 2279/35; B01D 46/0038; B01D 46/30
  See application file for complete search history.

(56) References Cited

U.S. PATENT DOCUMENTS

| | | | |
|---|---|---|---|
| 3,180,825 A | 4/1965 | Couvreur et al. | |
| 4,322,230 A | 3/1982 | Schoen et al. | |
| 4,568,925 A | 2/1986 | Butts | |
| 4,672,366 A | 6/1987 | Butts | |
| 4,793,932 A | 12/1988 | Ford et al. | |
| 4,851,136 A | 7/1989 | Fanqing et al. | |
| 4,971,477 A | 11/1990 | Webb et al. | |
| D330,962 S | 11/1992 | Cundy et al. | |
| 5,221,483 A | 6/1993 | Glenn et al. | |
| 5,450,975 A | 9/1995 | Lawrence | |
| 5,682,919 A | 11/1997 | DiMaggio | |
| 5,690,823 A | 11/1997 | Reipur et al. | |
| 5,704,306 A | 1/1998 | Den Ouden | |
| 5,870,871 A | 2/1999 | Stewart | |
| 5,975,132 A | 11/1999 | Gleeson | |
| 6,321,726 B1 | 11/2001 | Khami et al. | |

(Continued)

FOREIGN PATENT DOCUMENTS

| CN | 203154995 | 8/2013 |
|---|---|---|
| DE | 202013102214 | 6/2013 |

(Continued)

OTHER PUBLICATIONS

International Search Report and Written Opinion of PCT Serial No. PCT/US15/023367 May 29, 2015.

(Continued)

*Primary Examiner* — Christopher P Jones
(74) *Attorney, Agent, or Firm* — Middleton Reutlinger (57) ABSTRACT

According to some embodiments, a vent filter for a waste tank system is provided having a housing which eliminates or reduces the amount of bypass of odorous air moving through the vent system and precludes the odorous air from escaping without passing through filtering material. The housing includes a region wherein the cross-sectional area is reduced, inhibiting bypass of odorous gas past the filtering material.

20 Claims, 9 Drawing Sheets

(56) References Cited

U.S. PATENT DOCUMENTS

| | | | |
|---|---|---|---|
| 6,708,954 | B2 | 3/2004 | Chambers |
| 7,282,155 | B2 | 10/2007 | Boye |
| 7,381,559 | B2 | 6/2008 | Ellis et al. |
| 7,438,864 | B2 | 10/2008 | Murphy et al. |
| 7,571,895 | B2 | 8/2009 | Chiu |
| 8,408,417 | B2 | 4/2013 | Crone et al. |
| 8,449,661 | B2 | 5/2013 | Broborg |
| 8,562,835 | B2 | 10/2013 | Frye et al. |
| 8,679,215 | B2 | 3/2014 | Lim et al. |
| 2004/0149973 | A1 | 8/2004 | Chambers |
| 2008/0028734 | A1 | 2/2008 | McClain |
| 2008/0153645 | A1 | 6/2008 | Chiu |
| 2008/0209815 | A1 | 9/2008 | Chiu |
| 2012/0180666 | A1* | 7/2012 | Lim .................. B01D 53/0415 96/108 |

FOREIGN PATENT DOCUMENTS

| | | |
|---|---|---|
| GB | 609372 | 3/1946 |
| GB | 603846 | 6/1948 |
| WO | 2008029022 | 3/2008 |
| WO | 2011129729 | 10/2011 |

OTHER PUBLICATIONS

Big Orange Original Filter; Big Orange Holding Tank Vent Filter; Product Description; Retrieved from the Internet at http://biorangefilter.com/products/big-orange-filter; 6 pages. May 12, 2014.

Big Orange OEM Refill Kit; Product Description; Retrieved from Internet at http://bigorangefilter.com/collections/related-products/products/big-orange-oem-refill-kit; 5 pages. May 12, 2014.

Vetus No-Smell Filter for Waste Tanks; Product Description; Retrieved from the Internet at http://www.jamestowndistributors.com/userportal/show_product.do?pid=15453&family; 3 pages. May 12, 2014.

AirForce High Performance Holding Tank Vent Filter; High Performance Marine Products; Retrieved from Internet at http://airforcefilters.com; 1 page. May 12, 2014.

The New Marsan Odour Filter; Marine Sanitation Pty Ltd.; Product Description; Retrieved from the Internet on May 12, 2014 at http://marinesanitation.com.au/2012/10/31/the-new-marsan-odour-filter; 2 pages. Oct. 31, 2012.

LeeSan Microvent Holding Tank Breather Filter; Product Information; Retrieved from the Internet at http://leesan.com/index.asp?m=3&cat1=77&cat2=80&p=255&t=Microvent Holding; 3 pages. May 12, 2014.

Trionic Vent Filter; Holding Tank Vent Filters; Product Information; Retrieved from the Internet at https://www.trionicorp.com/holding-tank-vent-filters.html; 1 page. May 12, 2014.

Sealand Sanigard (TM) Holding Tank Vent Filters; Product Information; Retrieved from the Internet at http://www.westmarine.com/sealand--sanigard-holding-tank-vent-filters--P000447144; 2 pages. May 12, 2014.

Searus Sales, The No Stank Marine Holding Tank Vent Filter, http://cdn.shopify.com/s/files/1/0271/3743/files/no_stank_installation_instructions.pdf?405, 2013.

* cited by examiner

VENT FILTER

STATEMENT REGARDING FEDERALLY SPONSORED RESEARCH

None.

REFERENCE TO SEQUENTIAL LISTING, ETC.

None.

CLAIM TO PRIORITY

None.

BACKGROUND

1. Field of the Invention

Present embodiments generally pertain to a vent filter for marine or recreational vehicle use. More particularly, present embodiments relate to a vent filter for use with waste tanks wherein the vent filter prevents gas from bypassing filtering material within the housing.

2. Description of the Related Art

Recreational and marine vehicles utilize waste tanks which are plumbed into fluid communication with bathrooms aboard these vehicles and collect waste therefrom. These structures are vented to atmosphere to allow flow of air and water through the system, therefore providing proper operation. Since these structures are vented, it is desirable to reduce, or eliminate completely, the smell which emanates from the vent structure from interfering with enjoyable use of the boat, the RV, camper, or surrounding area.

In order to remove these odors, vent line filters have been desirable to connect in line with the waste system vent line. For example, boat owners can use onboard waste holding tanks to the extent the waste system will operate with minimal inconvenience and without offensive odor. The filter utilizes some filtration material therein which absorbs or filters odors from the air passing through the vent line and scrubs the air to reduce the smell which is vented from the waste system.

During operation, a volume of gas is forced from the holding or waste tank equal to the volume of waste/water entering the holding tank. The volume of gas moves through the vent filter when new waste/water is added to the tank or during changes in atmospheric pressure associated with temperature or altitude.

If vent filters are mounted in a horizontal position and include the filtering particulate therein, the result may be that particulate material settles within the housing. As this occurs, air is capable of bypassing the filtration material between the filtering particulate and the housing.

Accordingly, it would be desirable to overcome these and other deficiencies in known waste tank filters. More particularly, it would be desirable to limit gas from bypassing filtering material in the vent filter.

SUMMARY

According to some embodiments, a vent filter for a waste tank system is provided having a housing which eliminates or reduces the amount of bypass of odorous air moving through the vent system and precludes the odorous air from escaping without passing through filtration material.

According to some embodiments, a vent filter for a holding tank may comprise a vent filter housing having a first axial end and a second axial end. The vent filter housing may be defined by a wall which is substantially rigid. A flow path may extend between the first axial end and the second axial end, the first axial end and the second axial end having at least a first cross-sectional dimension. An intermediate location may be between the first axial end and a second axial end. The intermediate location may be between the first axial end and the second axial end may have a second cross-sectional dimension. The second cross-sectional dimension may be less than the first cross-sectional dimension. A filter material may be disposed in the flow path and fully covering the flow path at the intermediate location when the housing is in a substantially horizontal configuration.

Optionally, the vent filter may further comprise a biasing structure forcing the filter material toward the intermediate location where the second cross-sectional dimension is reduced. The housing may have a curved sidewall between the first axial end and the second axial end. Alternatively, the vent filter housing may have a linear sidewall extending between the first axial end and the second axial end. A fitting may be located at the first axial end of the housing. A second fitting may be located at the second axial end of the housing. The first and second fittings may be engaged by caps. The caps may be removable.

According to some embodiments, a vent filter for a holding tank may comprise a vent filter housing defining a flow path extending between a first axial end and a second axial end. The vent filter housing may have a substantially rigid sidewall extending between the first axial end and the second axial end. A sealing cap assembly may be located at ends of the vent filter housing. A filter material may be located between the first axial end and the second axial end. The first and second axial ends may have at least one first cross-sectional shape and an area, and may have an intermediate location of the flow path wherein a second cross-sectional area is disposed between the first and second axial ends. The second cross-sectional area may be less than the first cross-sectional area, such that the filter material covers the flow path at the intermediate location. A biasing structure may be within the vent filter and applying a substantially axially directed force on the filter material.

Optionally, the cross-sectional shape may be circular or polygon shaped. The housing may have a single cross-sectional shape between the first axial end and the second axial end. A reduction in cross-sectional area at the intermediate location inhibits gas in the flow path from bypassing the filter material. The sealing cap assemblies having a nozzle at each of the first and second axial ends. The nozzle may be stepped of at least two diameters. Alternately, the nozzle may be tapered. As a further alternative, the nozzle may have a threaded portion for connection of a threaded hose.

According to still other embodiments, a vent filter may comprise a housing having a first nozzle at a first end and a second nozzle at a second end. A flow path may extend between the first end and the second end. The flow path may reduce in cross-sectional area between an input at one of the first end and the second end and an intermediate location of the flow path. The intermediate location may have a smaller cross-sectional area than the input. A particulate filter material may be disposed in the flow path and may cover the flow path at the intermediate location to inhibit gas from bypassing the particulate filter material.

Optionally, the particulate filter material may be activated carbon. The vent filter may further comprise a biasing structure within the housing to bias the particulate filter material toward the intermediate location.

All of the above outlined features are to be understood as exemplary only and many more features and objectives of the vent filter may be gleaned from the disclosure herein. Therefore, no limiting interpretation of this summary is to be understood without further reading of the entire specification, claims, and drawings included herewith.

BRIEF DESCRIPTION OF THE DRAWINGS

In order that the embodiments may be better understood, embodiments of the vent filter will now be described by way of examples. These embodiments are not to limit the scope of the claims as other embodiments of the vent filter will become apparent to one having ordinary skill in the art upon reading the instant description. Non-limiting examples of the present embodiments are shown in figures wherein:

DETAILED DESCRIPTION

It is to be understood that the vent filter is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-9, various embodiments of a waste tank vent filter. The waste tank vent filter comprises a housing which is shaped to preclude gaps from forming between the housing walls and the filtration material inside when the housing is arranged in a horizontal orientation for use.

Figure 1:
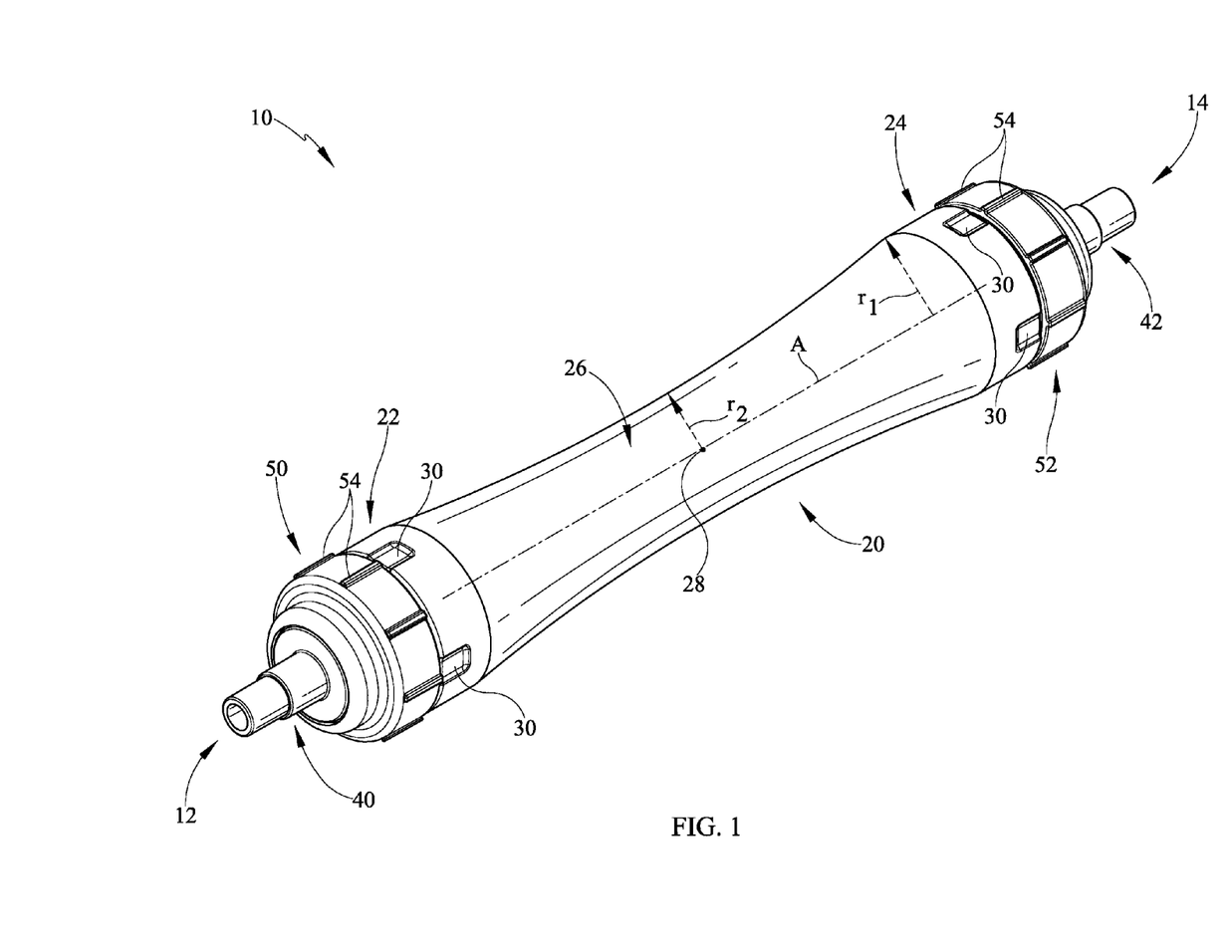
FIG. 1 is an isometric view of an exemplary vent filter for use in a marine or recreational vehicle.

Referring now to FIG. 1, a perspective view of a waste tank vent filter 10 is depicted. The vent filter 10 includes a housing 20 having a first end 12 and a second end 14 which define axial ends of the filter 10 and a gas flowpath 18 therebetween. A filter axis A extends between the first end and the second end 12, 14. One of the first end 12 or second end 14 may define an inlet and the other of the ends 12, 14 may define an outlet. With brief reference to FIG. 9 for context, the vent filter 10 is connected by piping, tubing or other flow structure for fluid communication with a waste tank 16 and scrubs waste gas exiting the waste tank 16 before the waste gas exits the system to atmosphere. In the embodiment shown in FIG. 9, the vent filter 10 is mounted horizontally, according to at least one embodiment, as will be discussed further herein.

Extending from the first end 12 is a nozzle fitting 40 and oppositely, a second nozzle fitting 42 at the second end 14 of the vent filter 10. The nozzle fittings 40, 42 are captured on the housing 20 by a cap 50 at the first end 12 and a cap 52 at the second end 14.

The housing 20 extends between the caps 50, 52. The housing 20 includes a first housing end 22 and a second housing end 24. A sidewall 26 defines the housing 20 between the housing ends 22, 24. The sidewall 26 is circular in cross-section according to the first embodiment although cross-sectional shapes may be utilized. At the housing ends 22, 24 of the housing 20, the circular cross-section is of at least a first radius and the housing 20 has a midpoint 28 which is of a lesser radius than the housing ends 22, 24. As a result, the housing sidewall 26 is curved along the axial direction between the midpoint 28 and the housing ends 22, 24 or between housing ends 22, 24 and through the midpoint 28. As will be discussed further, the curvature is not the only form of radius reduction which may be utilized. The housing 20 may be shaped so as to decrease cross-sectional area alternatively by linear tapering rather than curvature.

The outer housing ends 22, 24 of the housing 20 have a first radius $r_1$ as depicted in the figure. The midpoint 28 comprises a second radius $r_2$ which is less than $r_1$. Although the second radius $r_2$ is depicted at the midpoint 28, the second radius $r_2$ which may be disposed at various locations other than the midpoint 28 in order to accomplish the goal of creating a neck or area where filtering material is compacted and precludes bypass leakage of odorous air from the waste tank through the vent filter 10.

The housing 20 may be formed of various materials. According to one embodiment, the housing 20 may be formed of a polyethylene, for example a blow molded polyethylene. Other materials may be utilized in order to provide a substantially rigid housing 20 which has very limited flexing. The housing ends 22, 24 of the housing 20 may include gripping aids 30 which are integrally formed. According to the instant embodiment, the gripping aids 30 formed on the housing 20 is defined by one or more notches or indentations which allow for fingers to grasp the housing 20. These gripping aids 30 are utilized to hold the housing 20 still while the caps 50, 52 are removed or applied. Additionally, the gripping aids are utilized by a bracket 31 (FIG. 2) in order to retain the vent filter in position. The bracket 31 may be connected to a wall or other fixed structure and includes fingers 32 which are biased to seat within the gripping aids 30. The fingers 32 may flex to allow them to be seated within the gripping aids 30. Depending on the orientation of the bracket 31, the vent filter 10 may be oriented in a horizontal direction according to some embodiments.

Similarly, the caps 50, 52 may include cap gripping aids 54 disposed about the circumferential surface of the caps 50, 52. These cap gripping aids 54 are for aid in twisting the caps or end nuts 50, 52 and not necessarily related to the bracket 31.

Figure 2:
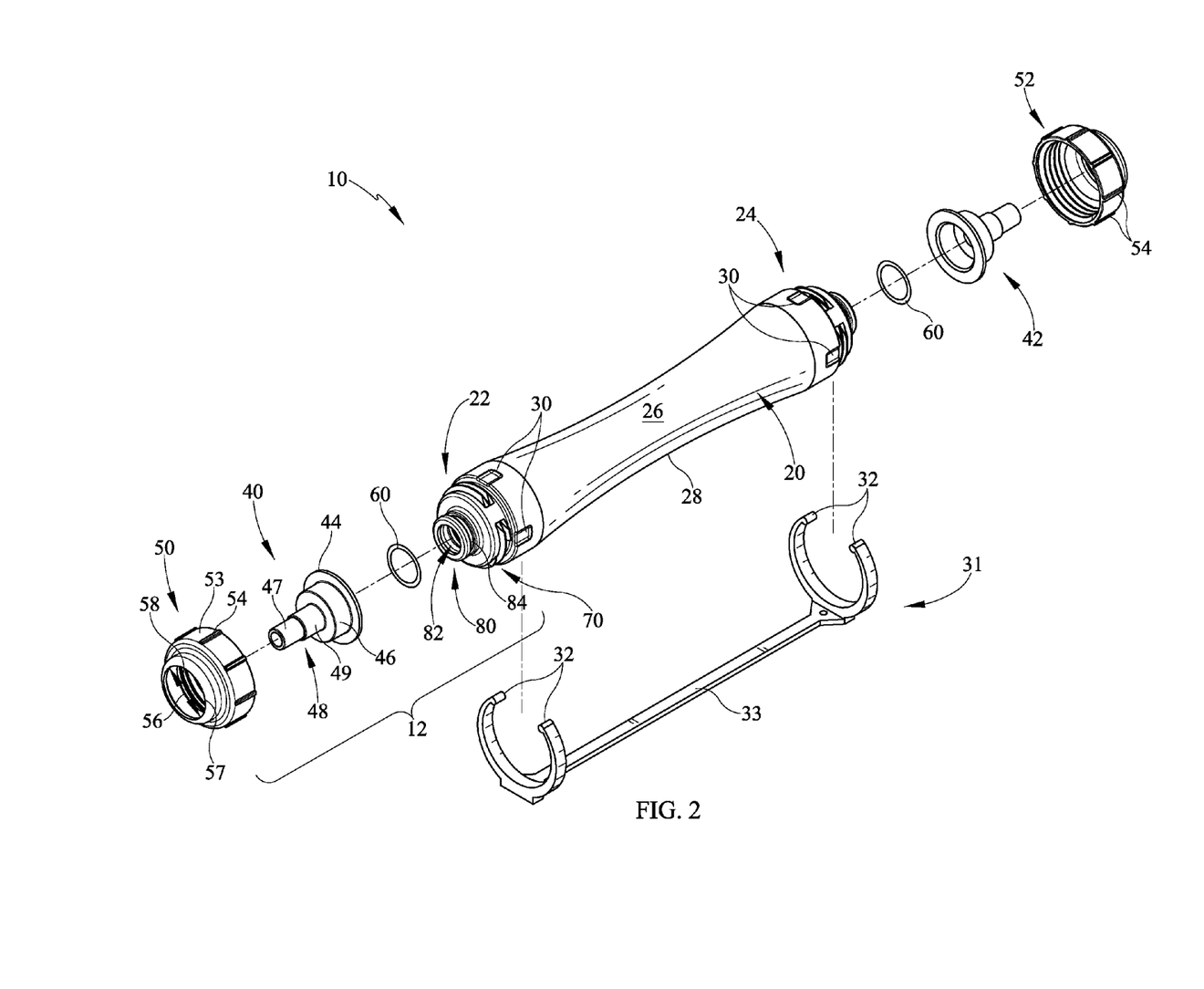
FIG. 2 is an exploded perspective view of the vent filter of FIG. 1.

Referring now to FIG. 2, an exploded perspective view of the waste tank vent filter 10 is shown. Starting at the first end 12 is the cap 50 and the nozzle fitting 40 and o-ring 60. According to the instant embodiment, the cap 50 is generally circular in shape having a cap wall 53 from which the gripping aids 54 extend. The cap wall 53 may taper or step down to a top wall 57 having an opening 56. The opening 56 allows passage of the nozzle 40, 42 therethrough. Opposite the top wall 57, the cap wall 53 includes some threads or other connection structure 58. This allows connection to housing 20.

The opening 56 is defined by a top wall 57 to allow passage of the nozzle fitting 40, 42. The cap 50 is attached to the housing 20 and tightens against the housing 20 in order to provide a retaining fit for the nozzle fitting 40, 42 on the housing 20. However, the cap 50 may be removed to remove and replace the filtration center section or housing 20.

The nozzle fitting 40, 42 is received at the housing end 22 and allows for fluid communication from within the housing 20 to a pipe or tube which is connected to the nozzle fitting 40, 42. Each nozzle fitting 40, 42 includes a flange 44 and a first cylindrical cap portion 46 which may have threads along an interior surface or may include a smooth wall upon which the o-ring 60 may engage. The flange 44 is seated on a surface at the housing end 22 so that a seal may be created. Alternatively, or in addition, a seal may be created by the o-ring 60 or at another location between the housing end 22 and the nozzle fitting 40. A connector or threaded portion 48 extends from the cap portion 46. The threaded portion 48 is shown as a stepped structure having a first diameter 47 and a second diameter 49. The threaded portion 48 has at least two steps so that tubes of varying diameters may be connected to the nozzle fitting 42 to provide increased operability of the vent filter 10. However, alternative embodiments may utilize a tapered connection or other fastening connection. For example, with reference to FIG. 8, alternative nozzle fittings 140, 142 are depicted having threaded connection. These fittings may be utilized with a garden hose for example, rather than tubing material. The nozzle fittings 140, 142 include a flange 144 and a cap portion 146 extending therefrom. One of the flange 144 and the cap portion 146 define a sealing surface along which a seal is formed. For example o-ring 60 may seal along the inner surface of cap portion 146. Extending from an end of cap portion 146, opposite the flange 144, is a threaded portion 148 including at least one thread 149 extending from an end 147 toward the cap portion 146. The threaded portion 148 allows for connection of a garden hose type fitting and hose to provide for venting to atmosphere, rather than a tube.

At the housing end 22 a plurality of threads or other fastening structures 70 are located. This allows engagement of the cap 50 and capture of the nozzle fitting 40 thereon. A nipple 80 extends from an end surface of the housing end 22 and provides a flow communication aperture 82 into the interior of the housing 20. A groove 84 is located along the nipple 80 to seat the o-ring 60 and allow for engagement with the nozzle fitting 40.

The fastening structures 70 located at the housing end 22 may be continuous or may be discontinuous to allow the cap 50 to slide on in an axial direction and be rotated to lock. Alternatively, the surface of the housing end 22 may include indentions which allow for a male thread on the cap 50 to engage. This structure may be a twist lock or other such feature to allow removal of the cap 50 and replacement of filtering material located within the housing 20. Further, in some embodiments, the cap 50 may not be removable.

The opposite housing end 24 of the housing 20 is similar to the first end 22 and therefore, is not discussed for reasons of repetitiveness.

Beneath the housing 20, the bracket 31 is shown. The bracket 31 may be fastened to a wall or other static structure and includes fingers 32. The fingers 32 extend about the housing ends 22, 24 to engage gripping aids 30 with detents at ends of the fingers 32. However this is merely one embodiment and various means may be utilized to retain the housing 20 in the bracket 31. The bracket 31 may be mounted in various configurations, but according to one embodiment the bracket 31 is mounted so that an arm 33 is mounted horizontally, wherein the vent filter housing 20 is also mounted horizontally.

Figure 3:
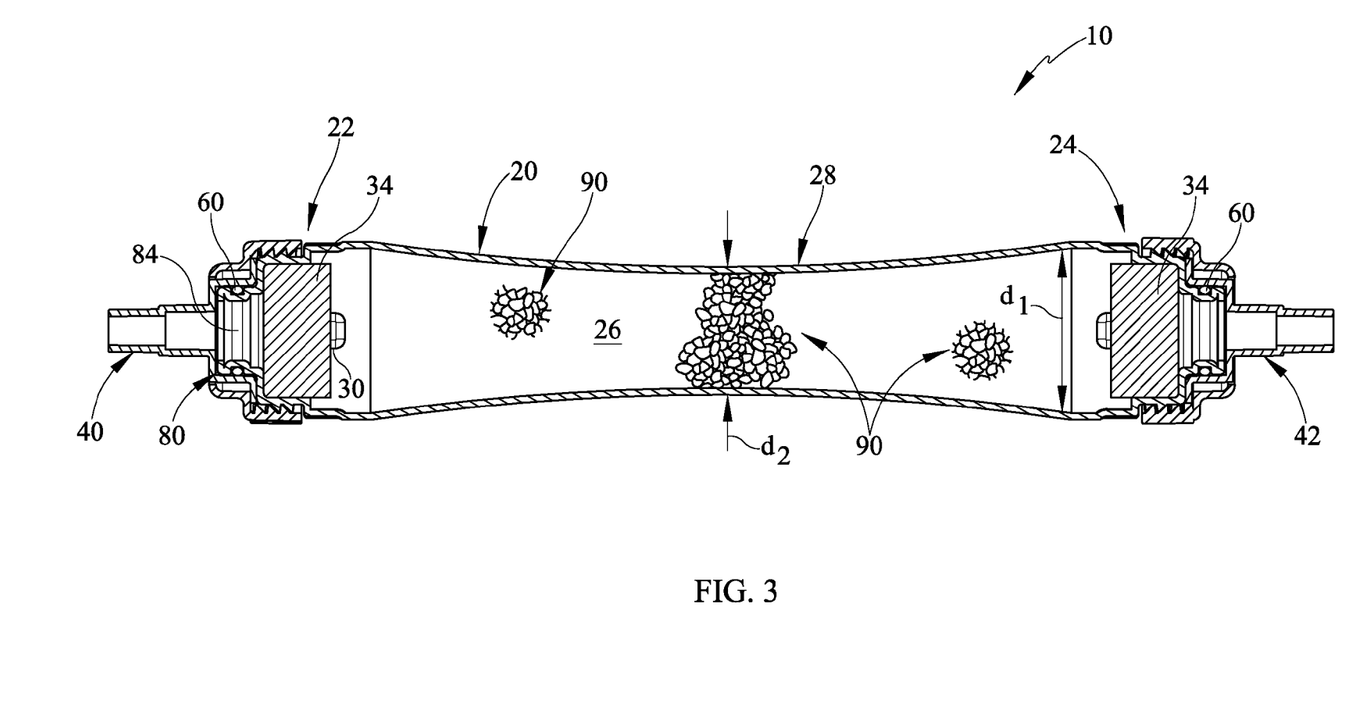
FIG. 3 is a side section view of the exemplary vent filter of FIG. 1.

Referring now to FIG. 3, a side section view of the vent filter 10 is depicted in an assembled construction. The housing 20 includes the nozzle fitting 40, 42 positioned on the nipple 80. The nozzle fitting 40, 42 is engaged by an o-ring 60 located in groove 84 which extends about the nipple 80. The nozzle fitting 40, 42 is in fluid communication with the interior of the housing 20 wherein a plurality of filter material 90 is located. Once the cap 50 is applied over the nozzle fitting 40, 42, the fitting 40, 42 is captured and sealed at the first housing end 22 and second housing end 24 of the housing 20.

As shown extending between the first end 22 and the second end 24 of the housing 20, a sidewall 26 is located wherein a first diameter $d_1$ is disposed at or near the first and second housing ends 22, 24 of the housing 20. The first and second housing ends 22, 24 may be of equivalent radius or alternatively, may be of differing radiuses. The filtering material may be a carbon filtration particulate, such as for non-limiting example activated carbon. The term "particulate" is meant to include various shapes and sizes of small granular or pelletized filtering material. This may include all of a single size or of particulate of various sizes within one or more ranges. In operation, the particulate or filtering material 90 generally settles downwardly from the upper sidewall 26 due to gravity and over a period of time. However, present embodiment shows that at the midpoint 28 of the housing 20, a second radius or diameter $d_2$ is less than the first radius $d_1$ at the first and second housing ends 22, 24. So that the particulate or filtering material 90 does not form a gap with the sidewall 26. The elimination of a gap between the sidewall 26 and the filtering material 90 at the midpoint 28 necessitates that odorous air passing from a first end to a second end 12, 14 of the vent filter 10 must pass through the filtering material 90. As a result, even over a period of time where normal settling occurs, the filtering material 90 will extend fully between the necked area for example at the midpoint 28 so as to preclude any bypass of odorous air or gas.

As depicted in the figure, a biasing structure 34 is depicted. According to instant embodiments, the biasing structure 34 may be formed of a foam material which is squeezed to reduce its volume and inserted through apertures 82 (FIG. 2). Upon insertion of the spring or biasing structure 34, the ends of the housing 20 are blocked so that filtration material 90 cannot escape or leak from the housing 20. For example, the biasing structure 34 may be squeezed and inserted at a first end. Next the filtering material 90 is filled at an opposite end of the housing and a second biasing structure 34 is inserted to enclose the particulate in the housing 20.

The biasing structure 34 applies an axial force to the filtering material 90. The axial forces cause the filtering material 90 to be forced toward the midpoint 28 of the housing 20 from both housing ends 22, 24. This provides that the filtration material 90 extends to the midpoint 28 where the cross-sectional dimension $d_2$ is decreased. In this midpoint area, the particulate volume is such that its cross sectional area is at least sized to be equal to the midpoint cross-section and no gaps are formed between the housing sidewall 26 and the filtering material 90, even upon settling of the filtering material 90 over time and when the housing 20 is in a horizontal configuration. This arrangement ensures that the gases from the waste tank must be filtered and cannot bypass the particulate filtration material 90.

The biasing structure 34 may be formed of various materials including but not limited to resilient foams. Metallic springs and other structures may additionally be utilized.

Additionally, the biasing structure may take various shapes. For example in some embodiments, the biasing structure may have a circular cross-section. In other embodiments, the spring may have other cross-sectional shapes, such as square, rectangular or other polygons. Further, the cross-sectional shape of the spring need not match the cross-sectional shape of the housing 20. The biasing structures 34 may apply force to the filter material 90 regardless of shape so that the filter material 90 is urged toward the reduced dimension portion of the housing 20.

Figure 4:
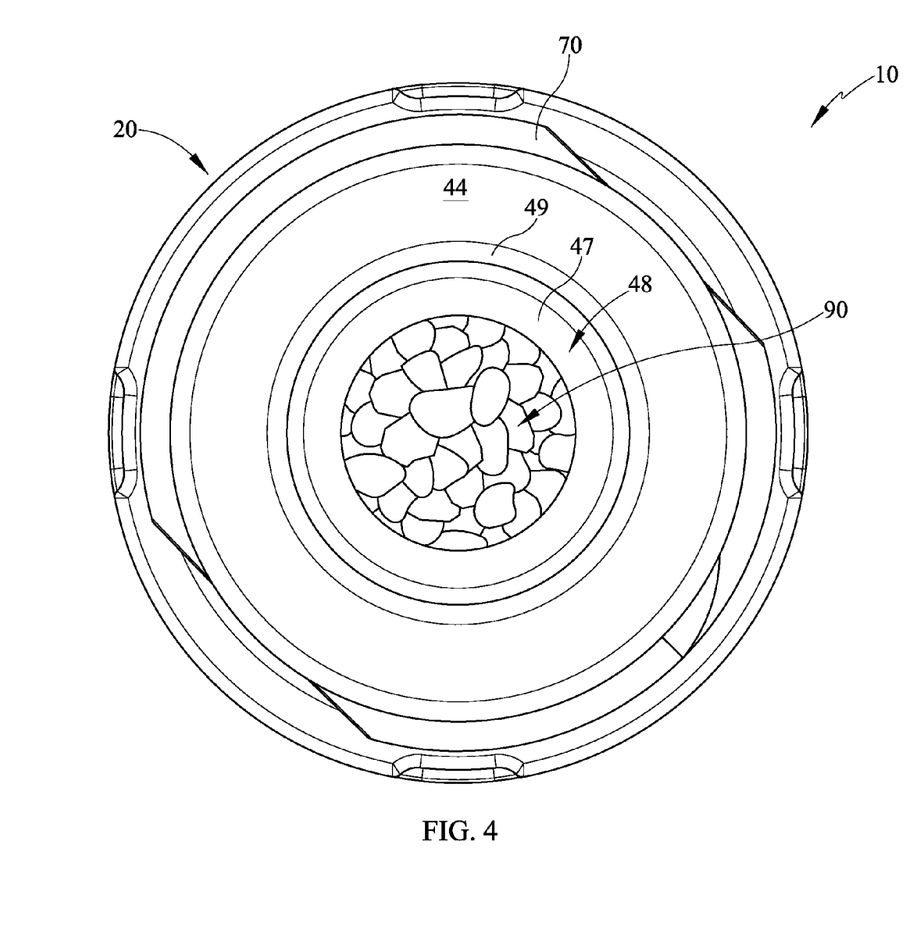
FIG. 4 is an axial end view of an exemplary vent filter.

Referring now to FIG. 4, an end view is depicted of the vent filter 10. In this embodiment, the biasing structure 34 is removed so that the filtering material 90 may be seen. The threaded portion 48 of the nozzle fitting 42 is shown extending from the housing first end 22. The axial end view shows the filtering material 90 positioned within the housing 20. As depicted, the filtering material 90 is fully covering the flow path within the housing 20 and requiring that the odorous gas pass therethrough.

Figure 5:
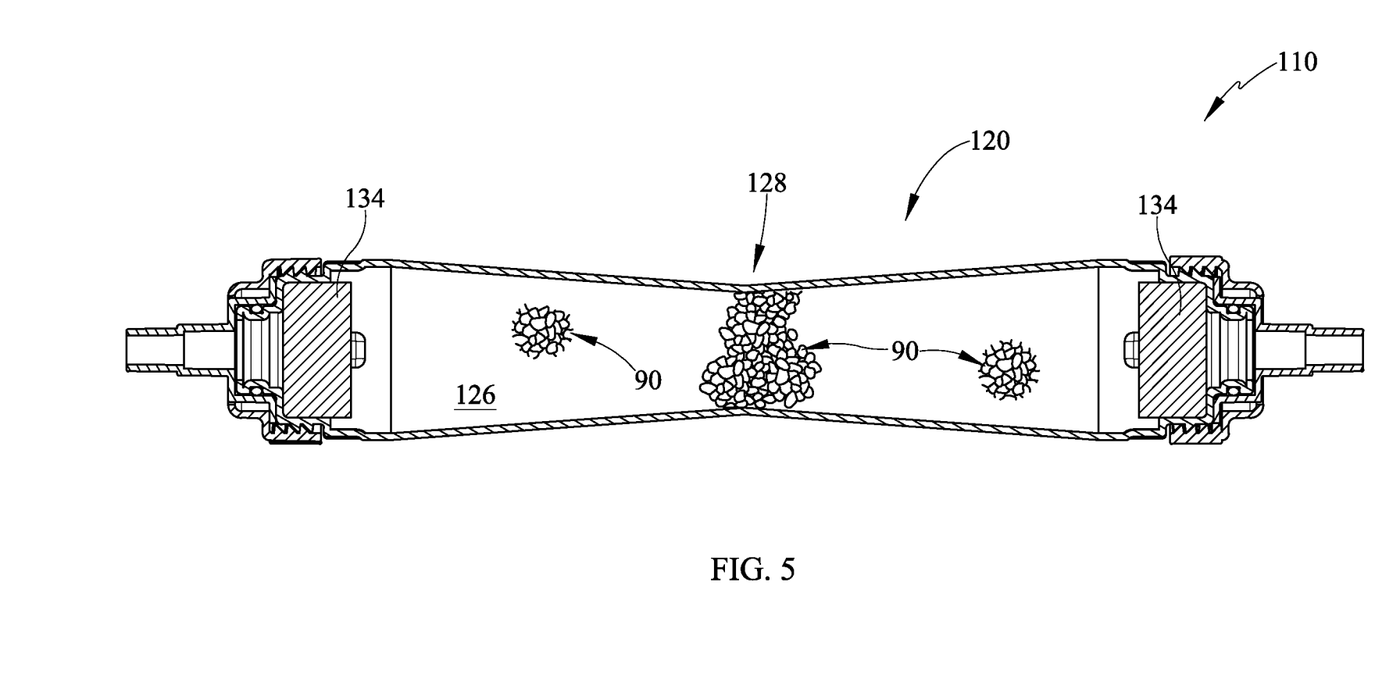
FIG. 5 is a side section view of an alternate embodiment of a vent filter.
Figure 6:
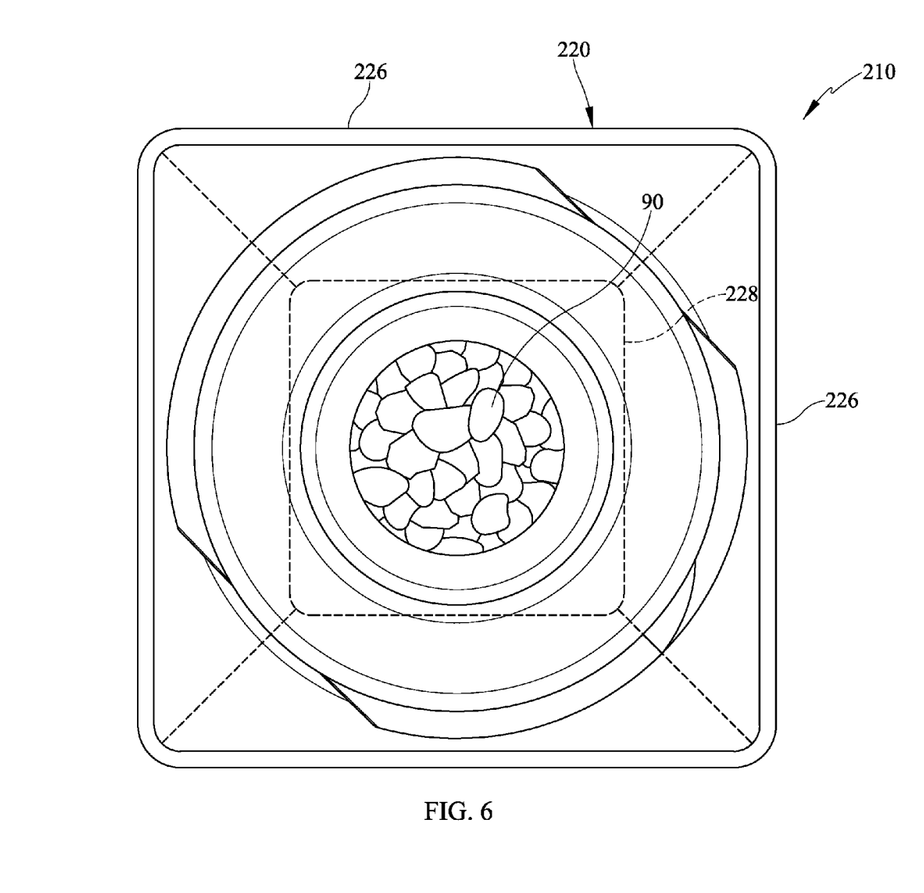
FIG. 6 is an axial end view of an alternate vent filter embodiment.

Referring now to FIGS. 5 and 6 an alternate construction is shown wherein a vent filter 110 is depicted having an alternate housing construction 120. The housing construction has a decreasing dimension along the axial direction as with the previous embodiment. However, the housing 120 is tapered in a linear fashion in the depicted embodiment rather than curved. Alternatively, at least one sidewall 126 may be curved as well to change from the outer dimension to the smaller dimension near the midpoint 128 of the housing 120.

As viewed in the axial end view of FIG. 6, a further alternative vent filter 210 embodiment is depicted wherein the housing 220 has a square cross-section. Again, the biasing structure 34 is removed for viewing of the filtering material 90 therein. The axial end view shows the filtration material 90 extends entirely across the opening depicted at or near the midpoint 228 of the instant embodiment. With this cross-section, the sidewalls 226 may be linearly tapered or may be curved to the smaller dimension.

Figure 7:
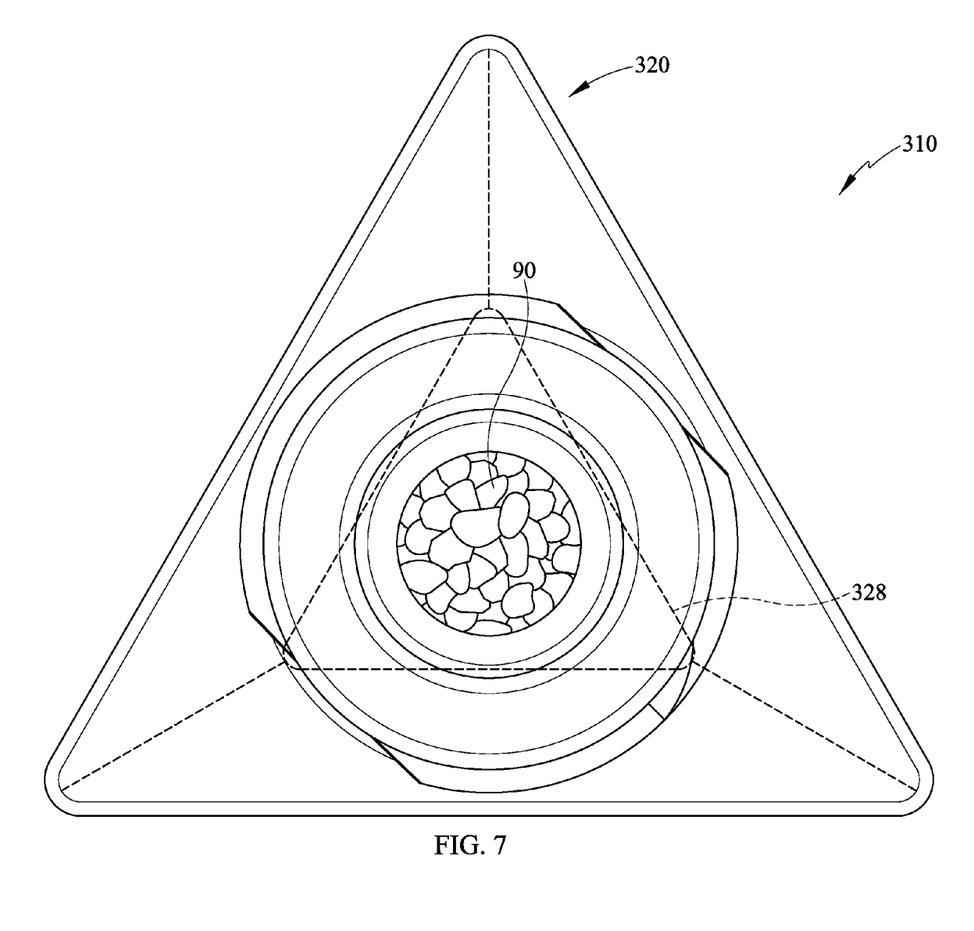
FIG. 7 is an end view of an alternate vent filter embodiment.
Figure 8:
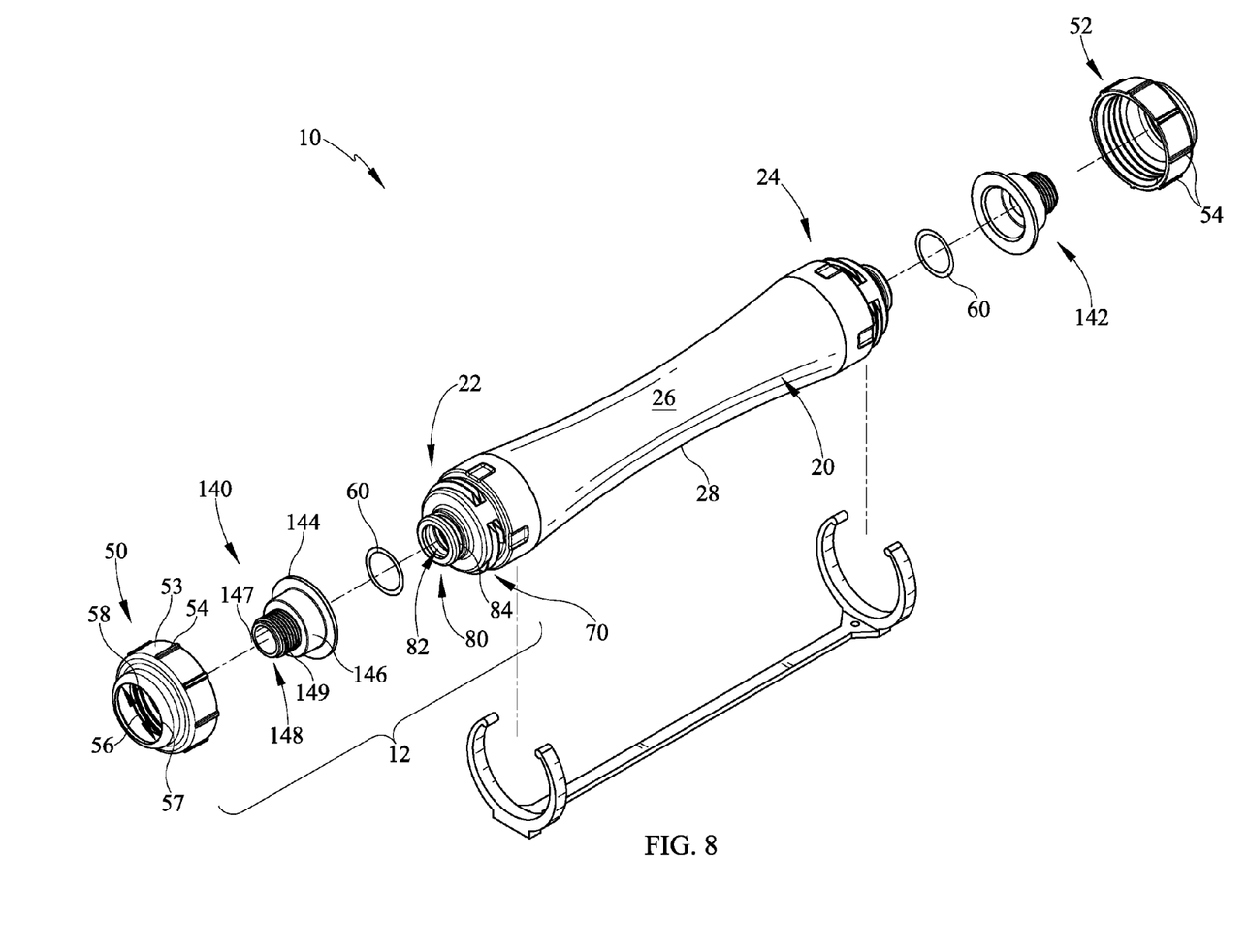
FIG. 8 is an exploded perspective view of a vent filter with an alternative fitting; and, FIG. 9 is a schematic view of the vent filter in fluid communication with a waste tank.
Figure 9:
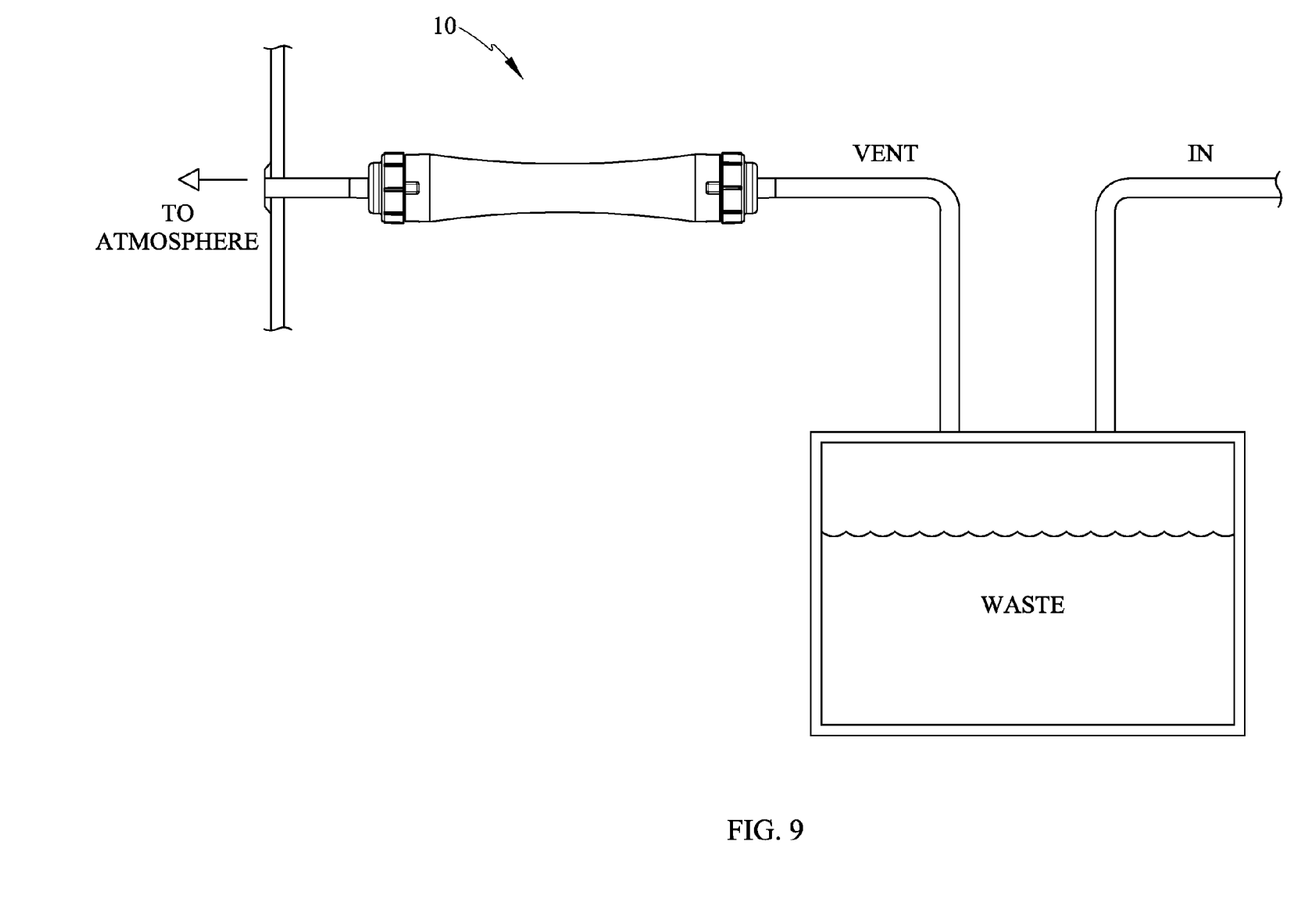

Referring to FIG. 7, a further alternative embodiment is shown with the biasing structure 34 removed. The vent filter 310 has a substantially triangular shaped housing 320. As depicted, the cross-sectional shape reduces in perimeter along an axial dimension. This may be linearly or curved reduction. However, it should be understood that various profiles may be utilized to create the housing such that the dimension at the ends of the housing 320 is less than that of the dimension at the midpoint 328 or at some point between the ends.

Additionally, it should be understood that the cross-sectional shape does not need to be consistent across the axial length of the housing. For example, the housing structure may be molded or otherwise formed so that the ends of the housing have at least one cross-sectional shape and the midpoint or other location between the ends where the perimeter dimension is smaller may be of a second cross-sectional shape.

The filtering material or particulate 90 may comprise an activated carbon to adsorb odors. Adsorption, as opposed to absorption, is when organic molecules bond to the internal pores of the activated carbon. This occurs in pores slightly larger than the molecules that are being adsorbed. The molecules of the waste gas become wrapped in the pores. The volume of carbon needed to remove the odorous gas over time is partially based on filter size, shape and the size of the holding tank and quantity and organic content of the waste water therein. Additionally, environmental factors may affect the amount of activated carbon utilized as well as the time that the carbon will function. The activated carbon may come from various sources including, but not limited to, nut shells, peat, wood, coir, lignite, coal and petroleum pitch. Various processes may be utilized to convert these materials into powder, granules and other physical forms.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A vent filter for a holding tank, comprising:
a one-piece vent filter housing having a first axial end and a second axial end;
said vent filter housing being defined by a wall which is substantially rigid;
a flow path extending between said first axial end and said second axial end for passive flow;
said first axial end and said second axial end having at least a first cross-sectional dimension;
an intermediate location between said first axial end and a second axial end, said intermediate location between said first axial end and said second axial end having a second cross-sectional dimension, said second cross-sectional dimension being less than said first cross-sectional dimension; and
a filter material disposed in said flow path and fully covering said flow path at said intermediate location when said housing is in a substantially horizontal configuration;
end caps connected to said vent filter housing, each of said end caps having a fitting extending therefrom for tubing connection.

2. The vent filter of claim 1 further comprising a biasing structure forcing the filter material toward said intermediate location where said second cross-sectional dimension is reduced.

3. The vent filter of claim 1, said housing having a curved sidewall between said first axial end and said second axial end.

4. The vent filter of claim 1, said housing having a linear sidewall extending between said first axial end and said second axial end.

5. The vent filter of claim 1 further comprising one of said fittings located at said first axial end of said housing.

6. The vent filter of claim 5 further comprising a second of said fittings located at said second axial end of said housing.

7. The vent filter of claim 6, said first and second fittings engaged by said end caps.

8. The vent filter of claim 7, said end caps being removable caps.

9. A vent filter for a holding tank, comprising:
a vent filter housing defining a flow path for a passive flow therethrough, said flow path extending between a first axial end and a second axial end;
said vent filter housing having a substantially rigid sidewall extending between said first axial end and said second axial end;
sealing cap assemblies located at ends of said vent filter housing, said sealing cap assemblies each including a fitting extending therefrom;
a filter material located between said first axial end and said second axial end;
said first and second axial ends having at least first cross-sectional shape and area;
an intermediate location of said flow path wherein a second cross-sectional area is disposed between said first and second axial ends and wherein said second cross-sectional area is less than said first cross-sectional area;
said filter material covering said flow path at said intermediate location; and,
a biasing structure within said vent filter and applying a substantially axially directed force on said filter material.

10. The vent filter of claim 9, said cross-sectional shape being circular.

11. The vent filter of claim 9, said cross-sectional shape being a polygon shape.

12. The vent filter of claim 9, said housing having a single cross-sectional shape between said first axial end and said second axial end.

13. The vent filter of claim 9, wherein a reduction in cross-sectional area at said intermediate location inhibits gas in said flow path from bypassing said filter material.

14. The vent filter of claim 9, each of said sealing cap assemblies having said fitting extending through a sealing cap at each of said first and second axial ends of said vent filter housing.

15. The vent filter of claim 14, each of said fittings being stepped of at least two diameters.

16. The vent filter of claim 14, said fittings being tapered.

17. The vent filter of claim 14, said fittings having a threaded portion for connection of a threaded hose.

18. A vent filter, comprising:
a housing having a first fitting extending from a first end and a second fitting extending from a second end;

a flow path extending between said first end and said second end;

said flow path reducing in cross-sectional area between an input at one of said first end and said second end and an intermediate location of said flow path;

said intermediate location having a smaller cross-sectional area than said input;

a particulate filter material disposed in said flow path and covering said flow path at said intermediate location to inhibit gas from bypassing said particulate filter material and, a cap located at each of said first end and said second end capturing said first fitting and said second fitting.

19. The vent filter of claim 18, said particulate filter material being activated carbon.

20. The vent filter of claim 18, further comprising a biasing structure within said housing to bias said particulate filter material toward said intermediate location.

* * * * *